US011660608B2

(12) United States Patent
Gillis

(10) Patent No.: US 11,660,608 B2
(45) Date of Patent: May 30, 2023

(54) PARTICLE SEPARATION BY DENSITY

(71) Applicant: SEPRO MINERAL SYSTEMS CORP., Langley (CA)

(72) Inventor: Andrew Gillis, Surrey (CA)

(73) Assignee: SEPRO MINERAL SYSTEMS CORP., Langley (CA)

( * ) Notice: Subject to any disclaimer, the term of this patent is extended or adjusted under 35 U.S.C. 154(b) by 0 days.

(21) Appl. No.: 17/714,672

(22) Filed: Apr. 6, 2022

(65) Prior Publication Data

US 2022/0226836 A1   Jul. 21, 2022

Related U.S. Application Data

(63) Continuation of application No. PCT/CA2021/050528, filed on Apr. 19, 2021.
(Continued)

(51) Int. Cl.
*B04B 1/08* (2006.01)
*C02F 11/127* (2019.01)

(52) U.S. Cl.
CPC .............. *B04B 1/08* (2013.01); *C02F 11/127* (2013.01)

(58) Field of Classification Search
CPC ................................. B04B 1/08; C02F 11/127
(Continued)

(56) References Cited

U.S. PATENT DOCUMENTS

| 556,567 | A | * | 3/1896 | Waring | ..................... B04B 1/00 494/80 |
| 2,161,476 | A | | 6/1939 | Leja | |
| 4,776,833 | A | | 10/1988 | Knelson | |

(Continued)

FOREIGN PATENT DOCUMENTS

| AU | 1748734 | 5/1934 |
| AU | 2205535 | 4/1935 |

(Continued)

OTHER PUBLICATIONS

International Search Report and Written Opinion of the International Searching Authority from the Canadian Intellectual Property Office, in PCT/CA2021/050528 dated Jul. 15, 2021, which is an international application corresponding to this U.S. application.
Brastorno; "Concetrador Centrifugo Conspeed," available prior to Apr. 21, 2020.
Sepro Mineral Systems; "SB5200-BR3.0 Installation, Operations and Maintenance Manual," available prior to Apr. 21, 2019.
Sepro Systems; "Retro Falcon Concentrators Video Circa 1990, Sepro Gravity Concentrators"; Apr. 5, 2011, retrieved on Apr. 20, 2022 from: https://www.youtube.com/watch?v=PMCDUJ7Mgnl&t=15s.

(Continued)

*Primary Examiner* — Shuyi S. Liu
(74) *Attorney, Agent, or Firm* — Kolitch Romano Dascenzo Gates LLC

(57) ABSTRACT

An apparatus for facilitating particle separation by density includes a separator having an inner surface surrounding a rotation axis and defining a particle path from an input end to an axially spaced output end. The inner surface includes a plurality of axially spaced dividers having respective inner positions, defining at least in part respective axially spaced retainers for collecting particles during rotation of the separator. The retainers each include at least one fluid inlet for fluidizing particles in the retainer during operation. The dividers include a first pair of adjacent dividers and a second pair of adjacent dividers, the first pair nearer the input end than the second pair, wherein a first divider slope of the first pair is greater than a second divider slope of the second pair and wherein each of the first and second divider slopes is zero or positive. Other systems, apparatuses and methods are disclosed.

20 Claims, 5 Drawing Sheets

Related U.S. Application Data

(60) Provisional application No. 63/013,289, filed on Apr. 21, 2020.

(58) Field of Classification Search
USPC .................................. 494/29, 43, 65, 36, 80
See application file for complete search history.

(56) References Cited

U.S. PATENT DOCUMENTS

| | | | |
|---|---|---|---|
| 5,895,345 A * | 4/1999 | Knelson | B04B 1/00 494/80 |
| 2004/0132601 A1 | 7/2004 | Peacocke et al. | |

FOREIGN PATENT DOCUMENTS

| | | | |
|---|---|---|---|
| CA | 1301725 C | 5/1992 |
| CA | 2140551 A1 | 2/1994 |
| CA | 2271958 C | 2/2000 |
| WO | 1996037307 A1 | 11/1996 |

OTHER PUBLICATIONS

Sepro Systems; "Falcon Concentrator in Operation, Sepro Gravity Concentrator"; Feb. 20, 2012, retrieved on Apr. 20, 2022 from: https://www.youtube.com/watch?v=eb_xHDTjG90.

Sepro Systems; "Inner Workings of a Sepro Falcon SB Gravity Concentrator"; Apr. 2, 2020, retrieved on Apr. 20, 2022 from: https://www.youtube.com/watch?v=BUSVc5LROuA, an equivalent version of which was publicly available prior to Apr. 2019.

* cited by examiner

PARTICLE SEPARATION BY DENSITY

CROSS REFERENCES

This application claims the benefit of U.S. Provisional Application No. 63/013,289 entitled "PARTICLE SEPARATION BY DENSITY", filed on Apr. 21, 2020, which is hereby incorporated by reference herein in its entirety.

BACKGROUND

1. Field

Embodiments of this present disclosure relate to particle separation and more particularly to particle separation by density.

2. Description of Related Art

Some systems for separating particles by density may cause particles to flow across riffles or dividers, such that higher density particles are stopped by the dividers and lower density particles pass over the dividers. The systems may include respective retainers or recesses for collecting the particles between the dividers. For example, some systems, such as centrifugal concentrators, may use rotating bowls having riffles or dividers disposed on inner surfaces of the bowls, such that particle flow upward and out of the bowl on an inner surface of the bowl is impeded by the dividers and high density particles may be retained in retainers or recesses therebetween. However, some known systems for separating particles may have features and/or geometry that may not facilitate efficient separation of particles by density.

SUMMARY

In accordance with various embodiments, there is provided an apparatus for facilitating particle separation by density. The apparatus includes a separator having an inner surface surrounding a rotation axis of the separator and defining a particle path from an input end of the separator to an axially spaced output end of the separator, wherein the inner surface includes a plurality of axially spaced dividers having respective inner positions, the dividers defining at least in part respective axially spaced retainers for collecting particles during rotation of the separator, each of the retainers including at least one fluid inlet for fluidizing particles in the retainer during operation. The plurality of dividers include a first pair of adjacent dividers and a second pair of adjacent dividers, the first pair of adjacent dividers nearer the input end than the second pair of adjacent dividers, wherein a first divider slope relative to the rotation axis between inner positions of the first pair of adjacent dividers is greater than a second divider slope relative to the rotation axis between inner positions of the second pair of adjacent dividers and wherein each of the first and second divider slopes is zero or positive.

The first and second divider slopes may include first and second ratios of radial position difference over axial position difference respectively.

The first divider slope may be greater than about 10 degrees.

The first divider slope may be greater than about 20 degrees.

The second divider slope may be less than about 10 degrees.

The plurality of dividers may include a third pair of adjacent dividers, the third pair of adjacent dividers nearer the output end than the second pair of adjacent dividers, wherein a third divider slope relative to the rotation axis between inner positions of the third pair of adjacent dividers is zero or positive and is less than the second divider slope.

The third divider slope may be less than about 10 degrees.

The third divider slope may be less than about 3 degrees.

The plurality of dividers may include a fourth pair of adjacent dividers, the fourth pair of adjacent dividers nearer the output end than the third pair of adjacent dividers, wherein a fourth divider slope relative to the rotation axis between inner positions of the fourth pair of adjacent dividers is zero or positive and is less than the third divider slope.

The fourth divider slope may be less than about 10 degrees.

The fourth divider slope may be less than about 3 degrees.

The plurality of dividers may include a fourth pair of adjacent dividers, the fourth pair of adjacent dividers nearer the output end than the third pair of adjacent dividers, wherein a fourth divider slope relative to the rotation axis between inner positions of the fourth pair of adjacent dividers is less than about 10 degrees.

The fourth divider slope may be less than about 3 degrees.

The inner positions for the dividers may lie on a parabolic path.

Respective divider slopes relative to the rotation axis between inner positions for each of the pairs of adjacent dividers may decrease from the input end to the output end of the separator.

A difference between two of the divider slopes may represent an angular difference of at least about 20 degrees.

The retainers may include a first pair of adjacent retainers and a second pair of adjacent retainers, the first pair of adjacent retainers nearer the input end than the second pair of adjacent retainers, wherein a first retainer slope relative to the rotation axis between retainer positions of the first pair of adjacent retainers is greater than a second retainer slope relative to the rotation axis between retainer positions of the second pair of adjacent retainers, the first and second retainer slopes being zero or positive.

The second retainer slope may be less than about 3 degrees.

The retainers may include a third pair of adjacent retainers, the third pair of adjacent retainers nearer the output end than the second pair of adjacent retainers, wherein a third retainer slope relative to the rotation axis between retainer positions of the third pair of adjacent retainers is zero or positive and less than about 3 degrees.

The retainers may have common minimum depths.

In accordance with various embodiments, there is provided a system for facilitating particle separation by density. The system includes the apparatus as described above, a rotation driver coupled to the apparatus for causing the separator of the apparatus to rotate about the rotation axis, and a particle source in particle communication with the input end of the separator and configured to provide particles to the input end of the separator while the separator rotates about the rotation axis.

Other aspects and features of embodiments of the present disclosure will become apparent to those ordinarily skilled in the art upon review of the following description of specific embodiments of the present disclosure in conjunction with the accompanying figures.

BRIEF DESCRIPTION OF THE DRAWINGS

In drawings which illustrate embodiments of the present disclosure.

DETAILED DESCRIPTION

Figure 1:
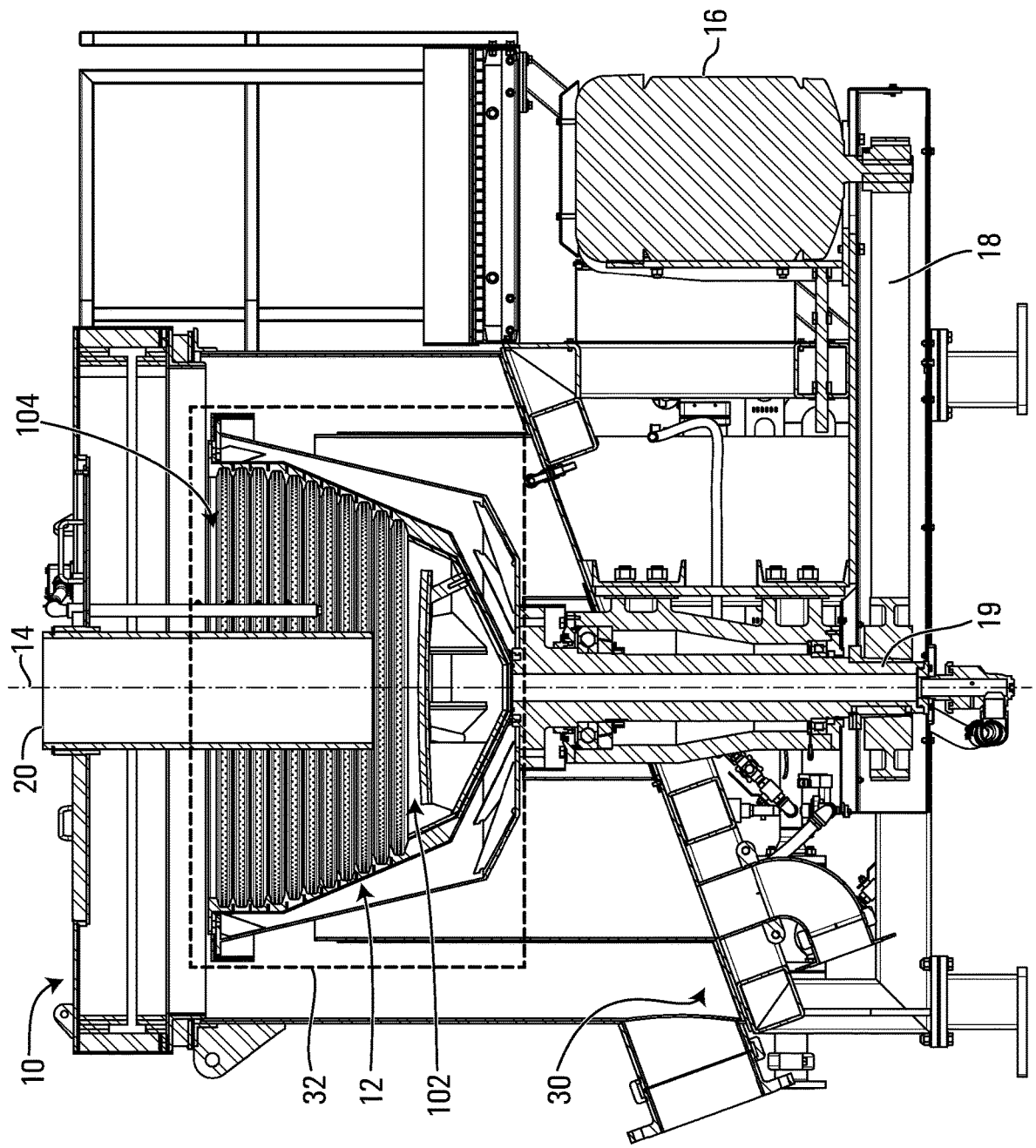
FIG. 1 is a sectional side view of a system for facilitating particle separation by density according to various embodiments of the present disclosure.

Referring to FIG. 1, there is shown a sectional view of a system 10 for facilitating particle separation by density, in accordance with various embodiments. In various embodiments, the system 10 may act as a centrifugal concentrator.

Referring to FIG. 1, the system 10 includes a separator 12 configured to rotate about a rotation axis 14. In some embodiments, the separator 12 may be referred to as a bowl. In various embodiments, the separator 12 may have properties and/or geometry that facilitates improved particle separation by density during operation. In various embodiments, the system 10 may include a motor 16 acting as a rotation driver coupled to the separator 12 for causing the separator to rotate about the rotation axis 14 during use. For example, in some embodiments, the motor 16 may be coupled to the separator 12 via a drive belt 18 and a drive shaft 19.

The system 10 may include a particle source 20 in particle communication with an input end of the separator 12 and configured to provide particles while the separator rotates about the rotation axis 14. For example, in various embodiments, the particle source 20 may include a feed tube. In some embodiments, the particles provided via the feed tube may be mixed in a slurry of water. For example, in some embodiments, a ratio of 60% water and 40% particles may be provided to the separator 12 by the particle source 20. For example, in some embodiments, the particle source 20 may provide about 500 metric tonnes per hour of solids. In some embodiments, different embodiments generally similar to the system 10 may be configured to process particles provided at rates from 50 kg/hr to more than 500 metric tonnes per hour of solids, for example.

In various embodiments, the particles may include high density particles, such as, for example, gold particles along with other particles of lower density, such as rocks, sand, and/or soil. In some embodiments, the separator 12 may be configured to separate the high density particles from the lower density particles as the separator 12 rotates about the rotation axis 14.

Figure 2:
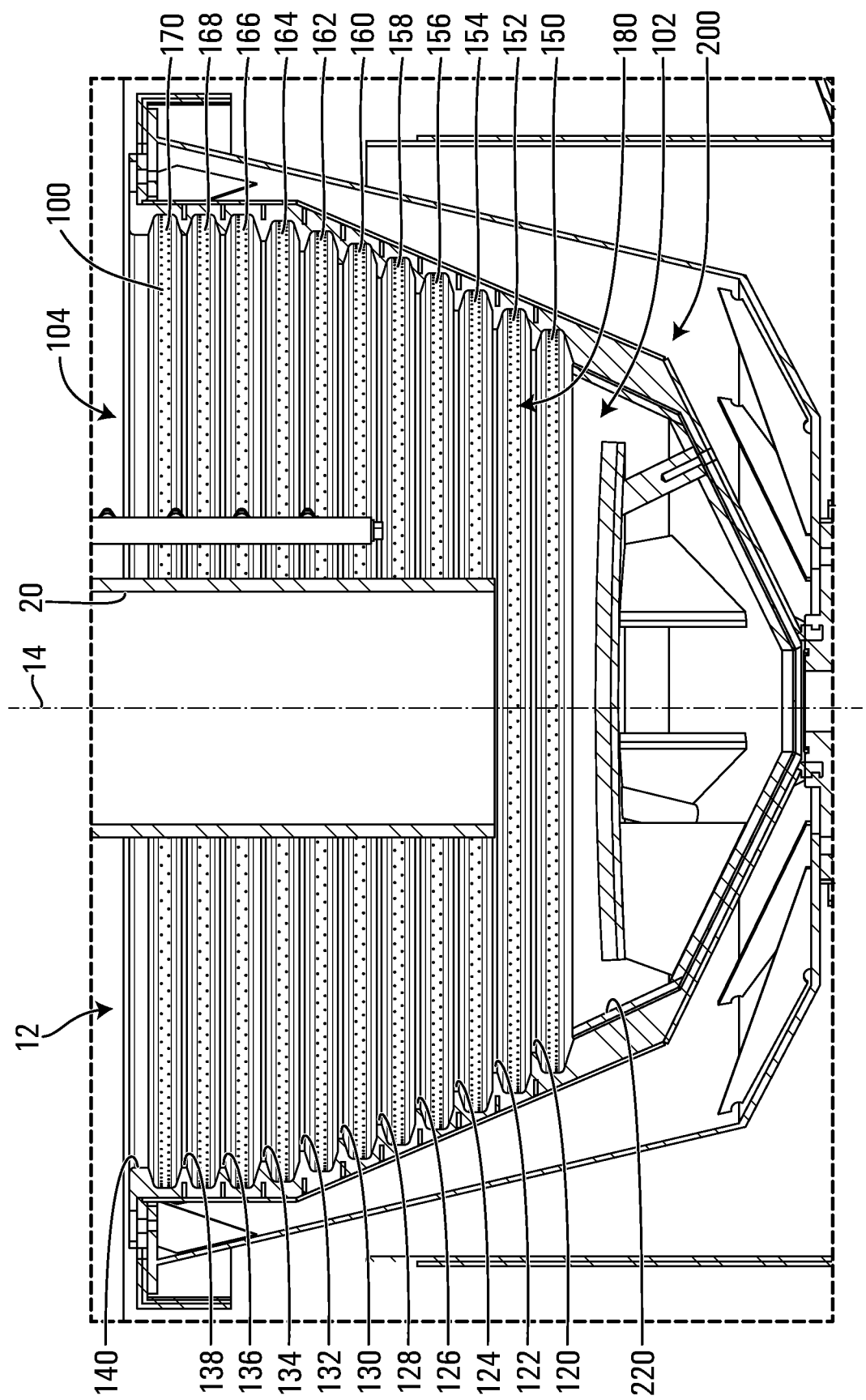
FIG. 2 is a sectional side view of a portion of the system shown in FIG. 1 according to various embodiments of the present disclosure.

Referring to FIG. 2, an enlarged view of a portion (shown at 32 in FIG. 1) of the system 10 including the separator 12 is shown, which depicts further detail of the separator 12 in accordance with various embodiments. Referring to FIG. 2, the separator 12 includes an inner surface 100 surrounding the rotation axis 14 of the separator 12. In various embodiments, the separator 12 may be made of a material or combination materials that is abrasion resistant and/or wear resistant, such as, for example, steel backing with a polyurethane cover/coating. In some embodiments, the separator 12 may include alternative or additional materials, such as, metal (e.g. steel), polyurethane, rubber, silicon carbide and/or combinations thereof. In various embodiments, the inner surface 100 may define a particle path from an input end 102 of the separator 12 to an axially spaced output end 104 of the separator 12.

Referring to FIG. 2, in various embodiments, the inner surface 100 may include axially spaced dividers 120, 122, 124, 126, 128, 130, 132, 134, 136, 138, and 140. In various embodiments, each of the dividers 120-140 may have a respective inner position relative to the rotation axis. In various embodiments, the inner position for a divider may be defined as the position of the innermost surface of the divider (e.g., an inner apex of the divider, closest to the rotation axis 14). In some embodiments, the dividers 120-140 may be generally annular, surrounding the rotation axis 14. In various embodiments, the dividers 120-140 may be generally symmetrical about the rotation axis 14.

Figure 3:
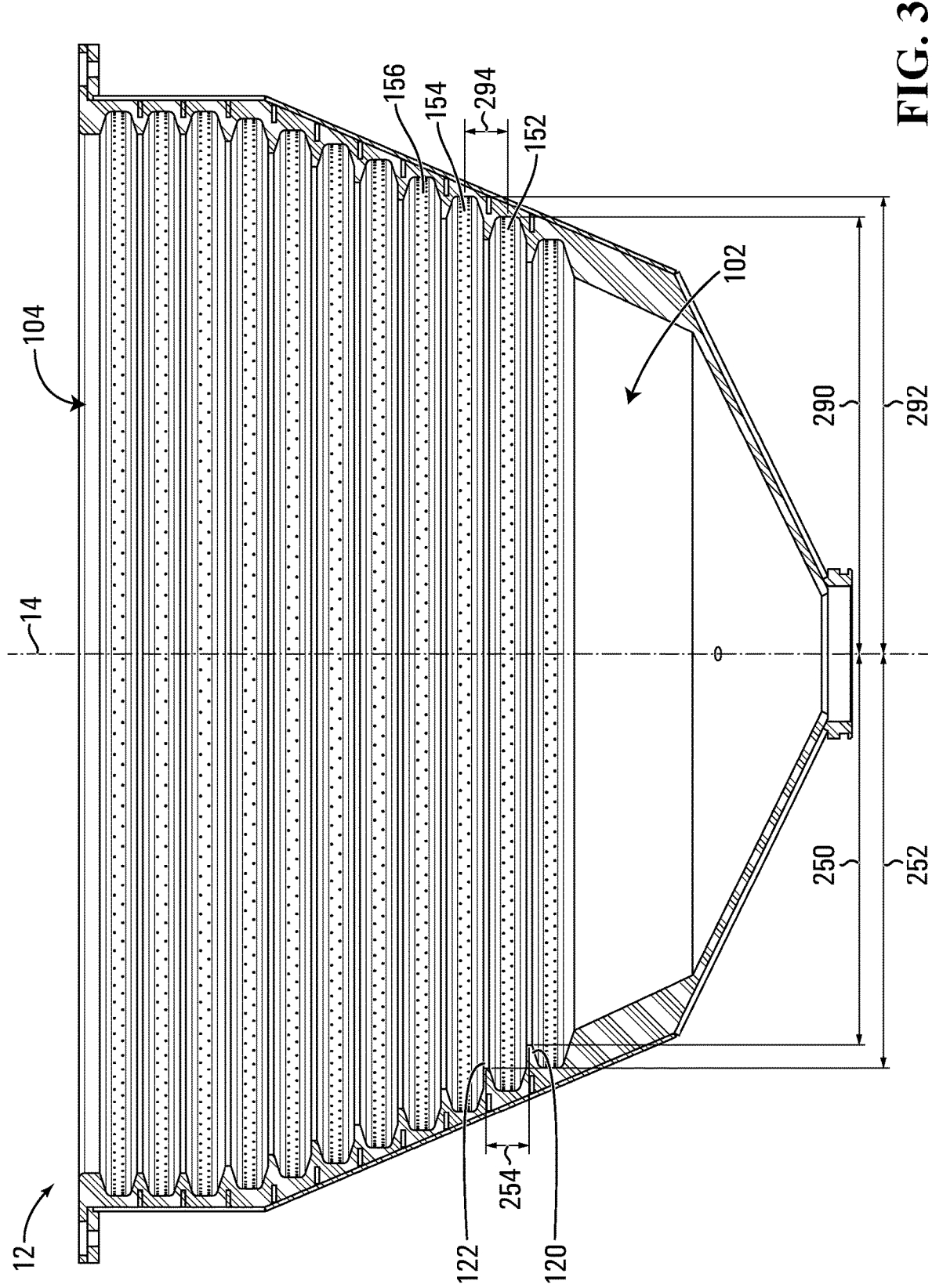
FIG. 3 is a sectional side view of a separator of the system shown in FIG. 1 according to various embodiments of the present disclosure.

In some embodiments, an inner position for each divider 120-140 may be expressed as a two coordinate position for the innermost surface of the divider: a radial position or measurement of distance from the rotation axis and an axial position or measurement along the rotation axis. For example, referring to FIG. 3, the separator 12 according to various embodiments, is shown in a cross sectional view, in isolation. Referring to FIG. 3, a radial position measurement for the divider 122 is shown at 252 and an axial position measurement depicting the axial position of the divider 122 is shown at 254. In the embodiment shown in FIG. 3, the axial position measurement may be a relative position and may be taken relative to a position of the divider 120, which is nearest the input end 102, and so the divider 120 may be considered to be at an axial position of 0. A radial position measurement for the divider 120 is shown at 250.

Referring to FIG. 2, in various embodiments, the dividers 120-140 may define respective axially spaced retainers 152, 154, 156, 158, 160, 162, 164, 166, 168, and 170 for collecting particles during rotation of the separator 12. In some embodiments, the separator 12 may also include a retainer 150. In some embodiments, the retainers may be generally symmetrical about the rotation axis 14. In some embodiments, each of the retainers 150-170 may include a set of fluid inlets for fluidizing particles in the retainer during operation. For example, in some embodiments, fluid inlets for the retainer 152 shown in FIG. 2 may include holes or passages along an outer radial wall of the retainer 152 (see for example, fluid inlet 180). In some embodiments, the fluid inlets may be in fluid communication with a fluid reservoir 200 surrounding the separator 12. For example, in some embodiments, the separator 12 may include about 400 holes or fluid inlets in each of the retainers with spacing of about 10 mm between the holes. In some embodiments, each of the retainers 150-170 of the separator 12 may include two axially spaced rows of fluid inlets, as shown in FIG. 2.

Referring still to FIG. 2, in various embodiments, the dividers 120-140 of the separator 12 may be positioned and/or configured to facilitate separation of particles by density that may be effective for both large and small particles. For example, in some embodiments, a difference in inner positions over axial displacement or slope for adjacent dividers may be lower for adjacent dividers near the output end 104 than it is for adjacent dividers near the input end 102, as described in further detail below and this may, in some embodiments facilitate improved particle separation.

Referring to FIG. 2, in some embodiments, for a first pair of adjacent dividers 120 and 122 and a second pair of adjacent dividers 122 and 124, the first pair nearer the input end 102 than the second pair, a first divider slope relative to the rotation axis between inner positions of the first pair of adjacent dividers 120 and 122 may be greater than a second divider slope relative to the rotation axis between inner positions of the second pair of adjacent dividers 122 and 124. In various embodiments, the first and second divider slopes may be zero or positive (i.e., not negative), such that the divider 124 is not closer to the rotation axis than the divider 122 and the divider 122 is not closer to the rotation axis than the divider 120.

In some embodiments, this reduction in divider slope may occur for respective pairs of adjacent dividers as they are considered from the input end 102 to the output end 104, as described in further detail below.

In some embodiments, this change in slope may allow the dividers near the input end 102 to separate or capture coarser high density particles while the dividers near the output end 104 separate or capture finer high density particles. In various embodiments, keeping the slope of the second pair of adjacent dividers zero or positive (i.e., not negative) may facilitate continued movement of the particles towards the output end, without excess build up of particles.

Operation

Referring to FIG. 1, as discussed above, the system 10 may facilitate particle separation by density. In various embodiments, a mixture of particles and fluid, such as for example, a 60-40 mixture of water and particles or slurry, may be provided by the particle source 20 to the input end 102 of the separator 12. In some embodiments, the slurry including the particles may be gravity fed through the particle source 20 to the input end 102 of the separator 12. In some embodiments, the slurry may be first size separated using a vibrating screen, for example, before being provided to the separator 12. In some embodiments, the particle source 20 may include a pump configured to pump the slurry into the input end 102 of the separator 12.

In various embodiments, while the particles are provided to the input end 102, the motor 16 may drive the separator 12 via the drive belt 18 and the drive shaft 19. For example, in some embodiments, the separator 12 may be driven at a nominal rotational speed of about 400 rpm by the motor 16 drawing 75 kW of power and rotating at about 1485 rpm.

Referring to FIG. 2, the particles may be urged outward to the inner surface 100 of the separator 12 by the rotation of the separator 12 about the rotation axis 14. Referring to FIG. 2, the inner surface 100 may include sloped walls 220 which may cause outward centrifugal forces to urge the particles upwards from the input end 102 towards the output end 104 of the separator 12.

The particles may first enter the retainer 150 shown in FIG. 2. In some embodiments, once the retainer is filled with particles, some particles may pass over the divider 120 into the adjacent retainer 152 shown in FIG. 2. In various embodiments, the particles that remain in the retainer 150 may include particles having higher density than those which pass over the divider 120 into the adjacent retainer 152. In various embodiments, the separator 12 may include fluid inlets, such as the fluid inlet 180, for example, in fluid communication with each of the retainers 150-170 to facilitate settling of higher density particles within the retainers. In various embodiments, the fluid inlets may include holes or passages in fluid communication with the reservoir 200 and the inner surface 100. In operation, water may be kept under pressure in the fluid reservoir 200 and the pressure of the water may cause the water to flow through the fluid inlets into the retainers 150-170.

Referring to FIG. 2, in various embodiments, the retainer 152 may be defined at least in part by the dividers 120 and 122. In various embodiments, once the retainer 152 is filled with particles, the particles may pass over the divider 122 into the retainer 154.

In various embodiments, an ease or rate at which the particles pass over the divider 122 may depend at least in part on a divider slope relative to the rotation axis 14 between inner positions of the dividers 120 and 122. In some embodiments, the divider slope may be determined as a ratio of radial position difference over axial position difference for the inner positions of the dividers 120 and 122. In various embodiments, the radial position of the divider 120 may be the radial distance or measurement between the innermost surface of the divider 120 and the rotation axis 14. For example, in some embodiments, the innermost surface of the divider 120 may be about 440 mm from the rotation axis 14 and so the radial position of the divider 120 may be about 440 mm. The radial position of the divider 122 may be determined similarly to be about 466 mm.

Referring to FIG. 3, the separator 12 according to various embodiments, is shown in isolation. Referring to FIG. 3, the measurement depicting the radial position of the divider 120 is shown at 250 and the measurement depicting the radial position of the divider 122 is shown at 252.

In various embodiments, the axial position of the divider 120 may be a position projected on the rotation axis 14 of the innermost surface of the divider 120. In some embodiments, where the innermost surface of the divider 120 may extend axially such that a cylindrical surface is provided, for example, an axial position of the divider may be the average axial position of the innermost surface of the divider. In some embodiments, axial positions may be measured relative to the divider closest to the input end 102 and so the divider 120 may be considered to have an axial position of 0 mm. In some embodiments, the divider 122 may have an axial position of about 48 mm. Referring to FIG. 3, the measurement showing the axial position of the divider 122 is shown at 254. In some embodiments, the dividers 120-138 may each have an axial surface height of about 6.4 mm, for example.

In various embodiments, the divider slope may be determined by the following equation:

$$m_{div} = \frac{r_{div2} - r_{div1}}{p_{div2} - p_{div1}}$$

where $r_{div1}$ is the radial position of the divider 120, $r_{div2}$ is the radial position of the divider 122, $p_{div1}$ is the axial position of the divider 120, and $p_{div2}$ is the axial position of the divider 122.

Accordingly, in various embodiments, the divider slope for the pair of adjacent dividers 120 and 122 may be about (466−440)/(48−0)=0.542. In some embodiments, the divider slope may be expressed in degrees (i.e., about $\tan^{-1}(26/48)$ =28.4 degrees). In various embodiments, the divider slope for the pair of adjacent dividers 120 and 122 may be positive, such that the divider 122 near the output end has a larger radial position than the divider 120, to facilitate flow of particles from the input end 102 to the output end of the separator 12 when the separator 12 rotates about the rotation axis 14.

In various embodiments, some particles that pass over the divider 122 may next pass over the divider 124 and enter the retainer 154 shown in FIG. 2. In various embodiments, the particles that do not pass over the divider 124 and remain in the retainer 152 may include particles having higher density than those which pass over the divider 124 into the adjacent retainer 154.

In various embodiments, the divider slope for the pair of adjacent dividers 122 and 124 may be less than the divider slope for the pair of adjacent dividers 120 and 122. In various embodiments, the divider slope for the pair of adjacent dividers 122 and 124 may be zero or positive (i.e., not negative). In various embodiments, this may facilitate flow of particles from the input end 102 to the output end of the separator 12. For example, in some embodiments, the divider 124 may have a radial position of about 489 mm and an axial position of about 97 mm. Accordingly, the divider slope for the pair of adjacent dividers 122 and 124 may be about (489−466)/(97−48)=0.469 or 25.1 degrees.

In various embodiments, having the divider slope for the pair of adjacent dividers 120 and 122 greater than the divider slope for the pair of adjacent dividers 122 and 124, which are downstream from the dividers 120 and 122, while keeping the divider slope zero or positive, may facilitate improved separation of particles by density. For example, in some embodiments, where high density particles such as gold are to be recovered using the system 10, higher recovery rates may be facilitated. In some embodiments, the improved separation may result from the dividers 120 and 122 shown in FIG. 1 being better suited for capturing larger high density particles in the retainer 152 whereas the dividers 122 and 124 may be better suited for capturing smaller high density particles in the retainer 154. In various embodiments, by keeping the divider slope zero or positive (i.e., non-negative), the particles may be encouraged to flow and improved particle separation may be facilitated.

In various embodiments, particles may next pass over the divider 126 and enter the retainer 156 shown in FIG. 2. In various embodiments, the particles that remain in the retainer 154 may include particles having higher density than those which pass over the divider 126 into the adjacent retainer 156. In various embodiments, the divider slope for the pair of adjacent dividers 124 and 126 may be less than the divider slope for the pair of adjacent dividers 122 and 124, but still not negative). For example, in some embodiments, the divider 126 may have a radial position of about 511 mm and an axial position of about 145 mm. Accordingly, the divider slope for the pair of adjacent dividers 124 and 126 may be about 0.458 or about 24.6 degrees.

In various embodiments, having the divider slope for the pair of adjacent dividers 122 and 124 greater than the divider slope for the pair of adjacent dividers 124 and 126 while also having the divider slope for the pair of adjacent dividers 120 and 122 greater than the divider slope for the pair of adjacent dividers 122 and 124 may facilitate improved separation of particles by density. For example, in some embodiments, where high density particles such as gold are to be recovered using the system 10, higher recovery rates may be facilitated.

In some embodiments, the improved separation may result from the dividers 120 and 122 shown in FIG. 2 being better suited for capturing larger high density particles in the retainer 152 whereas the dividers 122 and 124 and then 124 and 126 may be better suited for capturing progressively smaller high density particles in the retainers 154 and 156 respectively. In various embodiments, this progressive or stepped approach to particle separations may result in higher yields and/or more accurate particle separation by density. In various embodiments, by keeping the divider slopes zero or positive (i.e., non-negative), the particles may be encouraged to flow and improved particle separation may be facilitated.

In various embodiments, particles may next pass over the divider 128 and enter the retainer 158 shown in FIG. 2. In various embodiments, the particles that remain in the retainer 156 may include particles having higher density than those which pass over the divider 128 into the adjacent retainer 158. In various embodiments, the divider slope for the pair of adjacent dividers 126 and 128 may be less than the divider slope for the pair of adjacent dividers 124 and 126. For example, in some embodiments, the divider 128 may have a radial position of about 530 mm and an axial position of about 193 mm. Accordingly, the divider slope for the pair of adjacent dividers 126 and 128 may be about 0.396 or about 21.6 degrees.

In various embodiments, having a further divider slope where the slope is less and zero or positive may facilitate further improved separation of particles by density. For example, in some embodiments, where high density particles such as gold are to be recovered using the system 10, higher recovery rates may be facilitated. In some embodiments, the improved separation may result from the dividers 120 and 122, 122 and 124, 124 and 126, and 126 and 128 shown in FIG. 2 being better suited for capturing progressively smaller high density particles in the retainers 152, 154, 156, and 158 respectively. In various embodiments, by keeping the divider slope zero or positive, the particles may be encouraged to flow and improved particle separation may be facilitated.

In various embodiments, each additional pair of dividers with a reduced divider slope may facilitate improved separation of particles by density.

Referring to FIG. 2, during operation, rotation of the separator 12 about the rotation axis 14 may cause the particles to continue to flow from the input end 102 to the output end 104, over the dividers 120-140. Referring now to FIG. 1, some particles will flow upwards over the divider 140 (shown in FIG. 2) and then outwards over the top of the separator 12. In various embodiments, these particles may flow out of the system 10 via a sloped output slide 30.

Referring to FIG. 2, the dividers 130, 132, 134, 136, and 138 may have radial positions and axial positions of (548 mm, 241 mm), (563 mm, 290 mm), (576 mm, 338 mm), (584 mm, 389 mm), and (584 mm, 437 mm) respectively. Accordingly, in various embodiments, the divider slopes for the pairs of adjacent dividers 120 and 122, 122 and 124, 124 and 126, 126 and 128, 128 and 130, 130 and 132, 132 and 134, 134 and 136, and 136 and 138 may be about 0.542 or about 28.4 degrees, about 0.469 or about 25.1 degrees, about 0.458 or about 24.6 degrees, about 0.396 or about 21.6 degrees, about 0.375 or about 20.6 degrees, about 0.306 or about 17.0 degrees, about 0.271 or about 15.15 degrees, about 0.157 or about 8.9 degrees, and about 0 or about 0 degrees, respectively.

In various embodiments, a difference between divider slopes for at least two of the divider slopes may represent an angular difference of at least about 20 degrees. For example, in various embodiments, the difference between the divider slopes for the pair of adjacent dividers 120 and 122 and the pair of adjacent dividers 136 and 138 may represent an angular difference of about 28.4 degrees. In some embodiments, this minimum difference in slopes may facilitate accurate separation by density of differing particle sizes.

In various embodiments, the divider slopes for pairs of adjacent dividers may decrease for each pair from the input end 102 to the output end 104. For example, in some embodiments, the divider slopes for pairs of adjacent dividers may decrease for the pairs of adjacent dividers 120 and 122, 122 and 124, 124 and 126, 126 and 128, 128 and 130, 130 and 132, 132 and 134, 134 and 136, and 136 and 138 as they progress from the input end 102 to the output end 104. In some embodiments, this progressive reduction of divider slopes while the slopes remain zero or positive (i.e., non-negative) may facilitate particle separation by density of progressively finer particles in the retainers 152-168.

In some embodiments, including the pair of adjacent dividers 136 and 138 which have a small divider slope near the output end after progressively decreasing divider slopes may facilitate particle separation of high density fine particles by the separator 12. For example, in some embodiments, the pair of adjacent dividers 136 and 138 may have a divider slope of less than about 10 degrees and this may facilitate particle separation of high density fine particles by the separator. In some embodiments, the pair of adjacent dividers 136 and 138 may have a divider slope of about zero degrees and this may facilitate particle separation of high density fine particles. In some embodiments, a slope of about zero degrees may be a slope of less than about 3 degrees.

Referring to FIG. 2, in some embodiments, the separator 12 may include a divider 140 near the output end. In some embodiments, the divider 140 may be adjacent to the divider 138 and may have a radial position and axial position of (584 mm and 492 mm), such that the pair of adjacent dividers 138 and 140 have a divider slope of about 0. In some embodiments, including the retainers 168 and 170 defined by respective pairs of dividers which both have a small divider slope near the output end after progressively decreasing divider slopes may facilitate particle separation of high density fine particles by the separator 12. For example, in some embodiments, the pairs of adjacent dividers 136 and 138 and 138 and 140 may each have a divider slope of less than about 10 degrees and this may facilitate particle separation of high density fine particles by the separator. In some embodiments, the pairs of adjacent dividers 136 and 138 and 138 and 140 may each have a divider slope of about zero degrees and this may facilitate particle separation of high density fine particles.

In some embodiments, centrifugal force generated by rotation of the separator 12 may push the particle slurry against the inner surface 100 shown in FIG. 2 and create an interface between the particle slurry and the atmosphere inside the separator 12. In some embodiments, the angle of this interface may be between about 5 degrees and about 10 degrees from the vertical axis of rotation. The angle may depend at least in part on the size of the particles within the slurry and the solids density of the slurry. Coarser particles (e.g., 2.0 mm) and higher solids density (e.g., 60% solids) may result in a higher angle (e.g. about 10 degrees in some embodiments). Finer particles (e.g., 0.1 mm) and lower solids density (e.g., 20% solids) may result in a lower angle (e.g. 5 degrees).

In some embodiments, the separator 12 may facilitate effective recovery of both coarse and fine heavy mineral particles by changing divider slopes from the input end 102 to the output end 104 such that some divider slopes are greater than the angle of the interface or axially inside of the slurry face and some divider slopes are less than the angle of the interface or axially outside of the slurry face. In some embodiments, pairs of adjacent dividers having divider slopes greater than the angle of the interface may effectively recover relatively coarser heavy mineral particles and pairs of adjacent dividers having divider slopes less than the angle of the interface may effectively recover relatively finer heavy mineral particles.

Accordingly, in some embodiments, at least one pair of adjacent dividers may have a divider slope of greater than the angle of the interface, such as, for example, greater than about 10 degrees. In some embodiments, at least one pair of adjacent dividers may have a divider slope of much greater than 10 degrees, such as, for example greater than 20 degrees, to facilitate particle separation of coarser particles. For example, in some embodiments, the divider slope for the pair of adjacent dividers 120 and 122 may be greater than about 20 degrees. In some embodiments, at least one pair of adjacent dividers nearer the output end 104 of the separator 12 may have a divider slope of less than the angle of the interface, such as, for example, less than about 10 degrees. For example, in some embodiments, the divider slope for each of the pairs of adjacent dividers 134 and 136, 136 and 138, and 138 and 140 may be less than about 10 degrees. In some embodiments, a progression of divider slopes from greater than 20 degrees to less than 10 degrees may promote slurry flow from the input end 102 to the output end 104 of the separator 12.

In some embodiments, the inner positions of at least some of the dividers 120-140 may lie generally on a parabolic path. For example, in some embodiments, inner positions for at least four of the dividers may generally lie on a parabolic path. Referring to FIG. 2, in some embodiments, the inner position of each of the dividers 120-134 may be determined generally using a parabolic function. For example, in some embodiments, the inner positions may follow the following parabolic function:

$$r = -4.460851806 \cdot 10^{-4} x^2 + 5.533849361 \cdot 10^{-1} x + 440.0538903$$

where r is the inner position in mm and x is the axial position in mm for each of the dividers 120-136. In some embodiments, the above equation may be true within less than about 0.5% of the radial position, for example, or in some embodiments, less than about 1 mm, for example, such that the inner positions for the dividers generally lie on a parabolic path. In some embodiments, using a generally parabolic path may facilitate improved particle separation by density. For example, in some embodiments, particle/material flow may be facilitated by following a smooth path as provided by a parabolic path, for example, and this may result in improved particle separation when compared to a path having abrupt changes in flow direction, for example.

Referring to FIG. 2, in some embodiments, the configuration of the retainers 150-170 may facilitate improved particle separation by density. For example, in some embodiments, the retainers 150-170 may slope outwards more near the input end 102 than near the output end 104 of the separator 12. In various embodiments, this may allow the retainers 150-170 to keep a consistent depth and may facilitate separation of larger particles near the input end 102 and separation of smaller particles near the output end 104. In some embodiments, the retainers 150-170 may have common depths. For example, in some embodiments the retainers 150-170 may have common minimum depths, measured radially, of about 25 mm.

In some embodiments, lower retainer volumes may improve concentrate grade (e.g., amount of target material vs. total amount of material collected) as the target material may be only collected on the surface of the retainers. However, in some embodiments, a minimum depth may be required so the water from the fluid inlets does not blow the target material (e.g. gold) off the surface of the retainers. Accordingly, in various embodiments, common minimum depths may be employed. In various embodiments, use of a depth of about 25 mm in the separator 12 shown in FIG. 2 to facilitate separation may be determined to be effective empirically.

Referring to FIG. 2, in some embodiments, each of the retainers 150-170 may have a respective retainer position relative to the rotation axis. In some embodiments, the retainer position for a retainer may be defined as the position of the central surface of the retainer (e.g., the position of the surface of the retainer midway between adjacent dividers defining the retainer). In some embodiments, the retainer position for a retainer may be defined as the position or average position of the outermost particle engaging surface of the retainer. In some embodiments, each of the retainer positions may be expressed using coordinates and may include a radial position and a relative axial position. For example, referring to FIG. 3, the retainer 152 may have a retainer position including a radial position shown at 290 and an axial position of 0. Referring still to FIG. 3, the retainer 154 may have a retainer position including a radial position shown at 292 and an axial position shown at 294, measured from the axial position of the retainer 152.

In some embodiments, the retainers 150-170 may include a first pair of adjacent retainers 152 and 154 and a second pair of adjacent retainers 154 and 156, the first pair of adjacent retainers nearer the input end 102 than the second pair of adjacent retainers, wherein a first retainer slope relative to the rotation axis between retainer positions of the first pair of adjacent retainers is greater than a second retainer slope relative to the rotation axis between retainer positions of the second pair of adjacent retainers and wherein the first and second retainer slopes are zero or positive. In some embodiments, this slope relationship may result in the retainers 152 and 154 sloping outwards more than the retainers 154 and 156. In various embodiments, this may allow the retainers to keep a consistent depth and may facilitate separation of larger particles near the input end 102 and separation of smaller particles near the output end 104.

In some embodiments, the retainer slope for the pair of adjacent retainers 152 and 154 may be determined using the following equation:

$$m_{ret} = \frac{r_{ret2} - r_{ret1}}{p_{ret2} - p_{ret1}}$$

where $r_{ret1}$ is the radial position of the retainer 152, $r_{ret2}$ is the radial position of the retainer 154, $p_{ret1}$ is the axial position of the retainer 152, and $p_{ret2}$ is the axial position of the retainer 154.

For example, in some embodiments, the retainer 152 may have a radial position of 290 and an axial position of 0 mm. In some embodiments, the retainer 154 may have a radial position of 515 mm and an axial position of 48 mm. In some embodiments, the retainer 154 may have a radial position of 515 and an axial position of 96 mm. Accordingly the retainer slope for the pair of adjacent retainers 152 and 154 may be calculated as about 0.500 or about 26.6 degrees. In some embodiments, the retainer 156 may have a radial position of 536 and an axial position of 144 mm. Accordingly the retainer slope for the pair of adjacent retainers 154 and 156 may be calculated as about 0.438 or about 23.6 degrees. Accordingly, in various, embodiments, the retainer slope for the pair of adjacent retainers 152 and 154 may be greater than the retainer slope for the pair of adjacent retainers 154 and 156.

In various embodiments, the retainers 158, 160, 162, 164, 166, 168, and 170 may have retainer positions (radial position, axial position) of about (536 mm, 96 mm), (556 mm, 145 mm), (573 mm, 193 mm), (589 mm, 241 mm), (602 mm, 289 mm), (610 mm, 340 mm), (610 mm, 389 mm), and (610 mm, 437 mm) respectively. Accordingly, the retainer slopes for pairs of adjacent retainers 156 and 158, 158 and 160, 160 and 162, 162 and 164, 164 and 166, 166 and 168, and 168 and 170 may be about 0.408, 0.354, 0.333, 0.271, 0.157, 0, and 0 respectively.

Accordingly, in various embodiments, the retainer slopes may progressively diminish from the input end 102 to the output end 104. In various embodiments, each pair of adjacent retainers that has a progressively diminishing retainer slope may facilitate improved particle separation.

In some embodiments, the retainer 150 may have a radial position of 465 mm and an axial position of −48 mm. Accordingly, the retainer slope for the pair of adjacent retainers 150 and 152 may be calculated as 0.542 or 28.4 degrees.

In some embodiments, the retainer slope between adjacent retainers 166 and 168 may be small. For example in some embodiments, the retainer slope between the adjacent retainers 166 and 168 may be less than about 10 degrees. In some embodiments, the retainer slope may be about zero or less than about 3 degrees. In some embodiments, having a small retainer slope of for at least one pair of adjacent retainers near the output end 104 may facilitate separating small particles near the output end. In some embodiments, the slope between adjacent retainers 168 and 170 may also be small, such that there are two pairs of adjacent retainers that have a retainer slope of about zero near the output end 104. In some embodiments, having more than one pair of adjacent retainers with a small slope near the output end 104 may facilitate more efficient separation of small particles by the system 10.

Referring to FIG. 1, in some embodiments, after the system 10 has been run for a separation time period, during which the separator 12 has rotated about the rotation axis 14 and particles have built up within the retainers 150-170 (shown in FIG. 2), the separator 12 may cease rotating and the particles may be recovered from the retainers 150-170. In various embodiments, particles that remain in the retainers 150-170 may include particles having higher density than those which flow upwards out of the output end 104 of the separator 12. In some embodiments, the separation time period may be about 30 to 60 minutes, for example. In various embodiments, the system 10 may be repeatedly run, with new particles input into the separator 12 and the separator 12 rotated about the rotation axis 14 for each run.

Separator Embodiments

In various embodiments, other separators or bowls that facilitate functionality generally similar to the separator 12 shown in FIGS. 1-3 may be used to facilitate particle separation by density generally as described herein regarding the separator 12.

Figure 4:
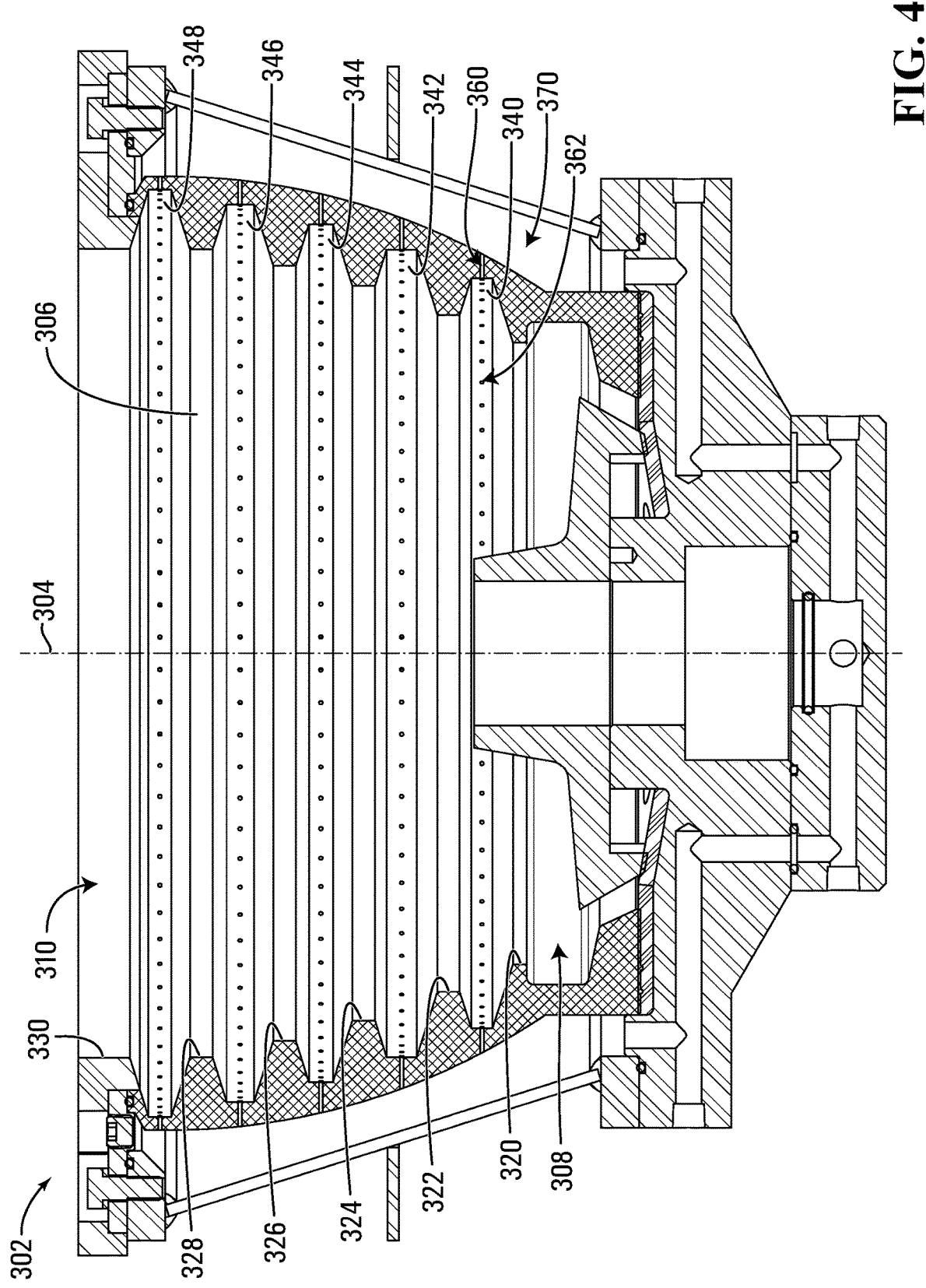
FIG. 4 is a sectional side view of a portion of a system for facilitating particle separation by density according to various embodiments of the present disclosure.

Referring to FIG. 4, there is shown a portion of a system according to various embodiments, which may include functional features generally similar to the system 10 shown in FIG. 1 and discussed above. Referring to FIG. 4, the system may include a separator 302, which may function generally similarly to the separator 12 described above and shown in FIGS. 1-3. In various embodiments, the separator 302 may be smaller than the separator 12, and may be configured to facilitate particle separation by density with lower throughput than the separator 12.

In operation, the system may include a motor acting as a rotation driver coupled to the separator 302 for causing the separator to rotate about a rotation axis 304 during use. In some embodiments, the system may include a particle source in particle communication with an input end 308 of the separator 302 and configured to provide particles while the separator rotates about the rotation axis 304. In various embodiments, while the particles are provided at the input end 308, the motor may drive rotation of the separator 302 about the rotation axis 304.

Referring to FIG. 4, the particles may be urged outward to an inner surface 306 of the separator 302 by the rotation of the separator 302 about the rotation axis 304. Referring to FIG. 4, the inner surface 306 may be generally sloped outward which may cause outward centrifugal forces to urge the particles upwards from the input end 308 towards an output end 310 of the separator 302.

Referring to FIG. 4, the inner surface 306 of the separator 302 may surround the rotation axis 304 and define a particle path from the input end 308 to the axially spaced output end 310. In various embodiments, the inner surface 306 may include axially spaced dividers 320, 322, 324, 326, 328, and 330 having respective inner positions, the dividers defining at least in part respective axially spaced retainers 340, 342, 344, 346, and 348 for collecting particles during rotation of the separator. In various embodiments, each of the retainers 340-348 may include fluid inlets for fluidizing particles in the retainer during operation. For example, the retainer 340 may include holes or fluid passages (e.g., including those shown at 360 and 362), which are in fluid communication with a fluid reservoir 370. In operation, water may be kept under pressure in the fluid reservoir 370 and the pressure of the water may cause the water to flow through the fluid inlets into the retainers 340-348.

In some embodiments, the dividers 320-330 may include a first pair of adjacent dividers 320 and 322 and a second pair of adjacent dividers 322 and 324, the first pair of adjacent dividers nearer the input end 308 than the second pair of adjacent dividers. In various embodiments, a first divider slope relative to the rotation axis between inner positions of the first pair of adjacent dividers 320 and 322 may be greater than a second divider slope relative to the rotation axis between inner positions of the second pair of adjacent dividers 322 and 324. Each of the first and second divider slopes may be non-negative slopes, which may in some embodiments encourage flow of particles from the input end 308 to the output end 310.

In various embodiments, the difference in slopes between the first pair of adjacent dividers and the second pair of adjacent dividers may facilitate improved separation of particles by density for at least the reasons provided above having regard to the separator 12 shown in FIGS. 1-3.

Referring to FIG. 4, in various embodiments, the dividers 320, 322, 324, 326, 328, and 330 may have inner positions (radial position, axial position) of about (131 mm, 0 mm), (143 mm, 30 mm), (155 mm, 66 mm), (164 mm, 99 mm), (170 mm, 134 mm), and (175 mm, 174.5 mm). Accordingly, in various embodiments the slopes between adjacent pairs of dividers 320 and 322, 322 and 324, 324 and 326, 326 and 328, and 328 and 330 may be about 0.400, 0.333, 0.273, 0.171, and 0.123 respectively. In various embodiments, each pair of adjacent dividers that has a progressively diminishing divider slope may facilitate improved particle separation, for example, as described above having regard to the separator 12 shown in FIGS. 1-3.

In some embodiments, the inner positions for the dividers 320, 322, 324, 326, 328, and 330 may lie on a parabolic path, such as for example, the parabolic path defined by the following function:

$$r = -1.040500288 \cdot 10^{-3} x^2 + 4.331438342 \cdot 10^{-1} x + 130.9909349$$

where r is the inner position in mm and x is the axial position in mm for each of the dividers 320-330.

Referring still to FIG. 4, in various embodiments, the configuration of the retainers 340-348 may facilitate improved particle separation by density. For example, in some embodiments, the retainers 340-348 may slope outwards more for adjacent retainers near the input end 308 than for adjacent retainers near the output end 310 of the separator 302. In various embodiments, the retainers 340-348 may have retainer positions (radial position, axial position) of about (158 mm, 0 mm), (170 mm, 34 mm), (181 mm, 68 mm), (189 mm, 102 mm), and (195 mm, 136 mm) respectively. Accordingly, in various embodiments the retainer slopes for pairs of adjacent retainers 340 and 342, 342 and 344, 344 and 346, and 346 and 348 may be about 0.353, 0.324, 0.235, and 0.176 respectively. In various embodiments, each pair of adjacent retainers that has a progressively diminishing retainer slope may facilitate improved particle separation.

Figure 5:
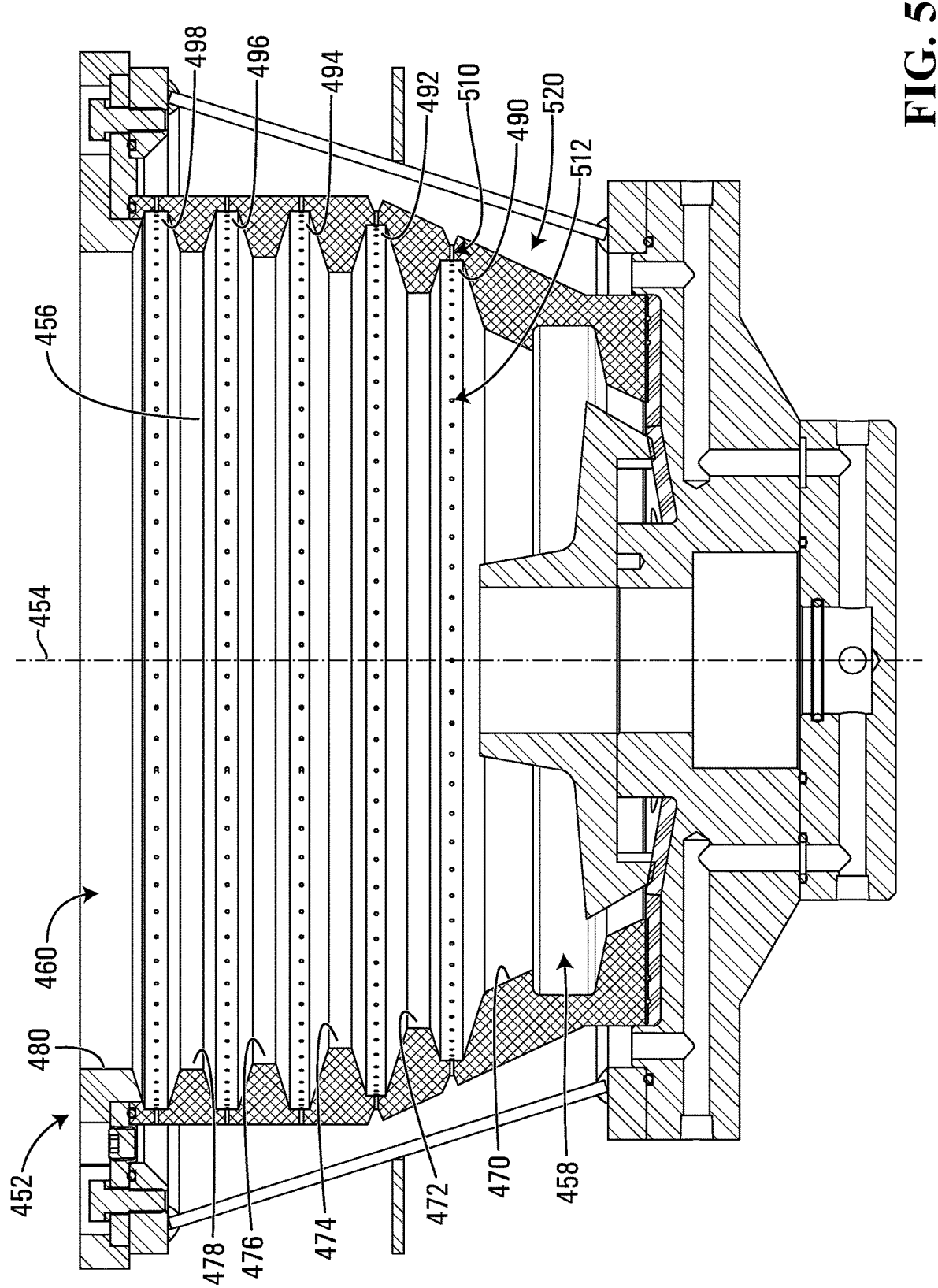
FIG. 5 is a sectional side view of a portion of a system for facilitating particle separation by density according to various embodiments of the present disclosure.

Referring now to FIG. 5, there is shown a portion of a system according to various embodiments, which may include functional features generally similar to the system 10 shown in FIG. 1 and discussed herein. Referring to FIG. 5, the system may include a separator 452, which may function generally similarly to the separators 12 and 302 described above and shown in FIGS. 1-3 and 4.

In some embodiments, the system may include a motor acting as a rotation driver coupled to the separator 452 for causing the separator to rotate about a rotation axis 454 during use. In some embodiments, the system may include a particle source in particle communication with an input end 458 of the separator 452 and configured to provide particles while the separator rotates about the rotation axis 454. In various embodiments, while the particles are provided at the input end 458, the motor may drive rotation of the separator 452 about the rotation axis 454.

Referring to FIG. 5, the particles may be urged outward to an inner surface 456 of the separator 452 by the rotation of the separator 452 about the rotation axis 454. Referring to FIG. 5, the inner surface 456 may be generally sloped outward which may cause outward centrifugal forces to urge the particles upwards from the input end 458 towards an output end 460 of the separator 452.

Referring to FIG. 5, the inner surface 456 of the separator 452 may surround the rotation axis 454 and define a particle path from the input end 458 to the axially spaced output end 460. In various embodiments, the inner surface 456 may include axially spaced dividers 470, 472, 474, 476, 478, and 480 having respective inner positions, the dividers defining at least in part respective axially spaced retainers 490, 492, 494, 496, and 498 for collecting particles during rotation of the separator. In various embodiments, each of the retainers 490-498 may include fluid inlets for fluidizing particles in the retainer during operation. For example, the retainer 340 may include holes or fluid passages (e.g., including those shown at 510 and 512), which are in fluid communication with a fluid reservoir 520.

In some embodiments, the dividers 470-480 may include a first pair of adjacent dividers 470 and 472 and a second pair of adjacent dividers 472 and 474, the first pair of adjacent dividers nearer the input end 458 than the second pair of adjacent dividers. In various embodiments, a first divider slope relative to the rotation axis between inner positions of the first pair of adjacent dividers 470 and 472 may be greater than a second divider slope relative to the rotation axis between inner positions of the second pair of adjacent dividers 472 and 474. Each of the first and second divider slopes may be non-negative slopes, which may in some embodiments encourage flow of particles from the input end 458 to the output end 460.

In various embodiments, the difference in slopes between the first pair of adjacent dividers and the second pair of adjacent dividers may facilitate improved separation of particles by density for at least the reasons provided above having regard to the separator 12 shown in FIGS. 1-3.

Referring to FIG. 5, in various embodiments, the divider 470 may have an inner position (corresponding to the innermost point of the divider 470) of about (129 mm, 0 mm). In various embodiments, the dividers 470, 472, 474, 476, 478, and 480 may have inner positions (radial position, relative axial position) of about (129 mm, 0 mm), (153 mm, 48 mm), (162 mm, 80 mm), (168 mm, 112 mm), (171 mm, 142 mm), and (171 mm, 178 mm). Accordingly, in various embodiments the slopes between adjacent pairs of dividers 470 and 472, 472 and 474, 474 and 476, 476 and 478, and 478 and 480 may be about 0.500, 0.281, 0.188, 0.100, and 0 respectively.

In various embodiments, each pair of adjacent dividers that has a progressively diminishing divider slope may facilitate improved particle separation, for example, as described above having regard to the separator 12 shown in FIGS. 1-3.

As discussed above, in some embodiments, having a small divider slope, which may be about zero, for example, near the output end 460 after having the divider slopes progressively decrease may facilitate capture and/or separation of fine particles near the output end 460.

Referring still to FIG. 5, in various embodiments, the configuration of the retainers 490-498 may facilitate improved particle separation by density. For example, in some embodiments, the retainers 490-498 may slope outwards more for adjacent retainers near the input end 458 than for adjacent retainers near the output end 460 of the separator 452. In various embodiments, the retainers 490-498 may have retainer positions (radial position, relative axial position) of about (167 mm, 0 mm), (182 mm, 32 mm), (187 mm, 63 mm), (187 mm, 94 mm), and (187 mm, 123 mm) respectively. Accordingly, in various embodiments the slopes for pairs of adjacent retainers 490 and 492, 492 and 494, 494 and 496, and 496 and 498 may be about 0.469, 0.161, 0, and 0 respectively. In various embodiments, each pair of adjacent retainers that has a progressively diminishing retainer slope may facilitate improved particle separation.

In some embodiments, the retainer slope for at least one pair of adjacent retainers may be small. For example, in some embodiments, the retainer slope may be less than about 10 degrees. In some embodiments, the retainer slope may be about 0 or less than about 3 degrees. For example, in some embodiments, there may be a retainer slope of about 0 for the retainers 494 and 496 and 496 and 498. In some embodiments, the retainer slope may be about zero for at least one retainer near the output end 460. In some embodiments, this may help to facilitate improved particle separation of fine particles in the retainers 494, 496 and 498 near the output end 460.

Various Embodiments

In some embodiments, some divider slopes may be negative, for example, near the output end 104 of the separator 12.

In some embodiments, the separators 12, 302 and/or 452 shown in FIGS. 2, 4, and 5 may include distinct parts or portions coupled together. For example, in some embodiments, the inner surfaces 100, 306, and/or 456 may be made of two or more distinct parts that may be coupled together to form a generally continuous surface.

In some embodiments, two pairs of adjacent dividers, for which the divider slopes may be compared, may include a common divider. In some embodiments, two pairs of adjacent dividers, for which the divider slopes may be compared may include only distinct dividers.

In some embodiments, two pairs of adjacent retainers, for which the retainer slopes may be compared, may include a common retainer. In some embodiments, two pairs of adjacent retainers, for which the retainer slopes may be compared may include only distinct retainers.

While specific embodiments of the present disclosure have been described and illustrated, such embodiments should be considered illustrative of the present disclosure only and not as limiting the present disclosure as construed in accordance with the accompanying claims.

The invention claimed is:

1. An apparatus for facilitating particle separation by density, the apparatus comprising:
    a separator having an inner surface surrounding a rotation axis of the separator and defining a particle path from an input end of the separator to an axially spaced output end of the separator, wherein the inner surface includes a plurality of axially spaced dividers having respective inner positions, the dividers defining at least in part respective axially spaced retainers for collecting particles during rotation of the separator, each of the retainers including at least one fluid inlet for fluidizing particles in the retainer during operation;
    wherein the plurality of dividers include a first pair of adjacent dividers and a second pair of adjacent dividers, the first pair of adjacent dividers nearer the input end than the second pair of adjacent dividers, wherein a first divider slope relative to the rotation axis between inner positions of the first pair of adjacent dividers is greater than a second divider slope relative to the rotation axis between inner positions of the second pair of adjacent dividers and wherein each of the first and second divider slopes is zero or positive;
    wherein the first divider slope is greater than about 10 degrees.

2. The apparatus of claim 1 wherein the first and second divider slopes comprise first and second ratios of radial position difference over axial position difference respectively.

3. An apparatus for facilitating particle separation by density, the apparatus comprising:
    a separator having an inner surface surrounding a rotation axis of the separator and defining a particle path from an input end of the separator to an axially spaced output end of the separator, wherein the inner surface includes a plurality of axially spaced dividers having respective inner positions, the dividers defining at least in part respective axially spaced retainers for collecting particles during rotation of the separator, each of the retainers including at least one fluid inlet for fluidizing particles in the retainer during operation;

wherein the plurality of dividers include a first pair of adjacent dividers and a second pair of adjacent dividers, the first pair of adjacent dividers nearer the input end than the second pair of adjacent dividers, wherein a first divider slope relative to the rotation axis between inner positions of the first pair of adjacent dividers is greater than a second divider slope relative to the rotation axis between inner positions of the second pair of adjacent dividers and wherein each of the first and second divider slopes is zero or positive; and wherein the first divider slope is greater than about 20 degrees.

4. The apparatus of claim 1 wherein the second divider slope is less than about 10 degrees.

5. An apparatus for facilitating particle separation by density, the apparatus comprising:

a separator having an inner surface surrounding a rotation axis of the separator and defining a particle path from an input end of the separator to an axially spaced output end of the separator, wherein the inner surface includes a plurality of axially spaced dividers having respective inner positions, the dividers defining at least in part respective axially spaced retainers for collecting particles during rotation of the separator, each of the retainers including at least one fluid inlet for fluidizing particles in the retainer during operation;

wherein the plurality of dividers include a first pair of adjacent dividers and a second pair of adjacent dividers, the first pair of adjacent dividers nearer the input end than the second pair of adjacent dividers, wherein a first divider slope relative to the rotation axis between inner positions of the first pair of adjacent dividers is greater than a second divider slope relative to the rotation axis between inner positions of the second pair of adjacent dividers and wherein each of the first and second divider slopes is zero or positive; and wherein the plurality of dividers include a third pair of adjacent dividers, the third pair of adjacent dividers nearer the output end than the second pair of adjacent dividers, wherein a third divider slope relative to the rotation axis between inner positions of the third pair of adjacent dividers is zero or positive and is less than the second divider slope.

6. The apparatus of claim 5 wherein the third divider slope is less than about 10 degrees.

7. The apparatus of claim 6 wherein the third divider slope is less than about 3 degrees.

8. The apparatus of claim 5 wherein the plurality of dividers include a fourth pair of adjacent dividers, the fourth pair of adjacent dividers nearer the output end than the third pair of adjacent dividers, wherein a fourth divider slope relative to the rotation axis between inner positions of the fourth pair of adjacent dividers is zero or positive and is less than the third divider slope.

9. The apparatus of claim 8 wherein the fourth divider slope is less than about 10 degrees.

10. The apparatus of claim 9 wherein the fourth divider slope is less than about 3 degrees.

11. The apparatus of claim 6 wherein the plurality of dividers include a fourth pair of adjacent dividers, the fourth pair of adjacent dividers nearer the output end than the third pair of adjacent dividers, wherein a fourth divider slope relative to the rotation axis between inner positions of the fourth pair of adjacent dividers is less than about 10 degrees.

12. The apparatus of claim 11 wherein the fourth divider slope is less than about 3 degrees.

13. The apparatus of claim 5 wherein the inner positions for the dividers lie on a parabolic path.

14. The apparatus of claim 5 wherein respective divider slopes relative to the rotation axis between inner positions for each of the pairs of adjacent dividers decrease from the input end to the output end of the separator.

15. The apparatus of claim 1 wherein a difference between two of the divider slopes represents an angular difference of at least about 20 degrees.

16. The apparatus of claim 1 wherein the retainers include a first pair of adjacent retainers and a second pair of adjacent retainers, the first pair of adjacent retainers nearer the input end than the second pair of adjacent retainers, wherein a first retainer slope relative to the rotation axis between retainer positions of the first pair of adjacent retainers is greater than a second retainer slope relative to the rotation axis between retainer positions of the second pair of adjacent retainers, the first and second retainer slopes being zero or positive.

17. The apparatus of claim 16 wherein the second retainer slope is less than about 3 degrees.

18. The apparatus of claim 16 wherein the retainers include a third pair of adjacent retainers, the third pair of adjacent retainers nearer the output end than the second pair of adjacent retainers, wherein a third retainer slope relative to the rotation axis between retainer positions of the third pair of adjacent retainers is zero or positive and less than about 3 degrees.

19. An apparatus for facilitating particle separation by density, the apparatus comprising:

a separator having an inner surface surrounding a rotation axis of the separator and defining a particle path from an input end of the separator to an axially spaced output end of the separator, wherein the inner surface includes a plurality of axially spaced dividers having respective inner positions, the dividers defining at least in part respective axially spaced retainers for collecting particles during rotation of the separator, each of the retainers including at least one fluid inlet for fluidizing particles in the retainer during operation;

wherein the plurality of dividers include a first pair of adjacent dividers and a second pair of adjacent dividers, the first pair of adjacent dividers nearer the input end than the second pair of adjacent dividers, wherein a first divider slope relative to the rotation axis between inner positions of the first pair of adjacent dividers is greater than a second divider slope relative to the rotation axis between inner positions of the second pair of adjacent dividers and wherein each of the first and second divider slopes is zero or positive; and wherein the retainers have common minimum depths.

20. A system for facilitating particle separation by density, the system comprising:

the apparatus of claim 1;

a rotation driver coupled to the apparatus for causing the separator of the apparatus to rotate about the rotation axis; and a particle source in particle communication with the input end of the separator and configured to provide particles to the input end of the separator while the separator rotates about the rotation axis.

* * * * *

UNITED STATES PATENT AND TRADEMARK OFFICE
CERTIFICATE OF CORRECTION

PATENT NO. : 11,660,608 B2
APPLICATION NO. : 17/714672
DATED : May 30, 2023
INVENTOR(S) : Andrew Gillis It is certified that error appears in the above-identified patent and that said Letters Patent is hereby corrected as shown below:

In the Claims

Column 17, Lines 7-8, Claim 3: the text "the first pair of adjacent dividers nearer the input end than the second pair of adiacent dividers," should read --the first pair of adjacent dividers nearer the input end than the second pair of adjacent dividers,--.

Column 17, Lines 33-34, Claim 5: the text "the first pair of adjacent dividers nearer the input end than the second pair of adiacent dividers," should read --the first pair of adjacent dividers nearer the input end than the second pair of adjacent dividers,--.

Column 18, Lines 44-53, Claim 19: the text "wherein the plurality of dividers include a first pair of adjacent dividers and a second pair of adiacent dividers, the first pair of adiacent dividers nearer the input end than the second pair of adiacent dividers, wherein a first divider slope relative to the rotation axis between inner positions of the first pair of adjacent dividers is greater than a second divider slope relative to the rotation axis between inner positions of the second pair of adiacent dividers and wherein each of the first and second divider slopes is zero or positive;" should read --wherein the plurality of dividers include a first pair of adjacent dividers and a second pair of adjacent dividers, the first pair of adjacent dividers nearer the input end than the second pair of adjacent dividers, wherein a first divider slope relative to the rotation axis between inner positions of the first pair of adjacent dividers is greater than a second divider slope relative to the rotation axis between inner positions of
the second pair of adjacent dividers and wherein each of the first and second divider slopes is zero or positive;--.

Signed and Sealed this
Twenty-seventh Day of June, 2023

Katherine Kelly Vidal
*Director of the United States Patent and Trademark Office*